United States Patent
Gileta et al.

[11] Patent Number: 5,203,489
[45] Date of Patent: Apr. 20, 1993

[54] GAS SHROUDED WAVE SOLDERING

[75] Inventors: John H. Gileta, Chateauguay; Raymond J. Chartrand, Kirkland; Derek E. Sellen, St. Hubert, all of Canada

[73] Assignee: Electrovert Ltd., La Prairie, Canada

[21] Appl. No.: 860,316

[22] Filed: Mar. 30, 1992

Related U.S. Application Data

[63] Continuation-in-part of Ser. No. 804,904, Dec. 6, 1991, abandoned.

[51] Int. Cl.⁵ ............................ B23K 1/00; B23K 3/08
[52] U.S. Cl. .................................. 228/219; 228/180.1; 228/37; 228/42; 228/56.1
[58] Field of Search ..................... 228/180.1, 219, 232, 228/260, 262, 37, 42, 56.1

[56] References Cited

U.S. PATENT DOCUMENTS

| | | | |
|---|---|---|---|
| 3,216,643 | 11/1965 | Verter | 228/37 |
| 3,704,686 | 12/1972 | Schrempp et al. | 228/37 |
| 4,412,641 | 11/1983 | Fuchs et al. | 228/37 |
| 4,568,012 | 2/1986 | Kakuhata et al. | 228/180.1 |

FOREIGN PATENT DOCUMENTS

| | | | |
|---|---|---|---|
| 286058 | 12/1986 | Japan | 228/37 |
| 1486281 | 6/1989 | U.S.S.R. | 228/37 |

*Primary Examiner*—Samuel M. Heinrich
*Attorney, Agent, or Firm*—Darby & Darby

[57] ABSTRACT

A cover plate extends over a solder reservoir and has a slot for a solder wave to extend up above the plate, a gas excluding oxygen is supplied under the cover plate and flows up through the slot on both sides of the solder wave to blanket the solder wave. It has been found that oxygen content on the surface of the solder and on the solder wave is reduced so that clean oxide free soldering occurs. The apparatus has a solder reservoir for holding solder with a solder nozzle projecting therefrom, a pump for forming a solder wave from the nozzle, a cover plate for covering at least a portion of the reservoir having a longitudinal slot for the solder wave to pass therethrough. Provision is made for supplying pressurized gas, which is oxygen free, to pass upwards through the slot on both sides of the solder wave to provide a gas blanket over the solder wave, and a conveyor conveys elements to be soldered to pass through the solder wave.

49 Claims, 4 Drawing Sheets

GAS SHROUDED WAVE SOLDERING

CROSS REFERENCE TO RELATED APPLICATION

The present application is a continuation-in-part of co-pending application Ser. No. 07/804,904 filed on Dec. 6, 1991, now abandoned.

TECHNICAL FIELD

The present invention relates to wave soldering of elements such as printed wiring boards and more specifically to solder coating of wettable metallic surfaces or joining at least two wettable metallic surfaces on wiring boards in a solder wave wherein the wave is blanketed with a gas atmosphere.

BACKGROUND ART

Printed wiring boards, circuit boards and other elements now have smaller wettable surfaces to be solder coated and joined. Whereas in the past flux was used to remove oxides from these surfaces, it has now been found that if soldering occurs within an inert gas or a shield gas atmosphere which excludes oxygen, then flux may not be necessary. In the present application, the term "inert" as applied to gas includes nitrogen. Furthermore dross and other oxides do not form on the surface of solder in an inert atmosphere. In the past dross and oxide particles have caused skips, bridges, or other defects to occur in soldered joints.

In U.S. Pat. No. 5,048,746 is disclosed a tunnel for fluxless soldering. In U.S. Pat. No. 5,044,542 is shown shield gas wave soldering. In both cases solder is applied to an element in a shield gas environment. The shield gas may be inert gas or a reducing gas which excludes oxygen. The benefits of soldering in an atmosphere which excludes oxygen are known.

Tardoskegyi in U.S. Pat. No. 3,705,457 and Elliott et al in U.S. patent application Ser. No. 549,603 both disclose the use of a gas knife jet, but only for applying a gas jet on one side of a solder wave, generally the downstream side.

DISCLOSURE OF INVENTION

In the present invention, it has been discovered that utilizing a cover, shroud or the like at least partially covering a solder reservoir and blanketing with a shield gas from within, one is able to reduce air to almost negligible amounts from the solder wave and around an element such as a wiring board and the like. Thus, wettable surfaces to be solder coated, such as circuit tracks, pads and metallized holes in boards with pins therein are kept substantially free of air. Furthermore the solder surface under the cover, and the solder wave surface are kept free of air avoiding dross forming on the solder wave and in many cases avoiding the necessity of having to use flux in the solder coating step.

In one embodiment of the present invention a cover is provided to cover the complete solder reservoir, blanketing not only the solder wave but also the reservoir, thus avoiding substantially all air from coming in contact with the solder surface. By utilizing a cover, only a small space has to be kept completely air free which is an easier proposition than when tunnels, hoods or enclosures and the like are used surrounding a solder wave. It has been found that oxygen content under a cover over a solder reservoir and blanketing a solder wave is reduced as illustrated in the embodiments described herein.

By utilizing a smaller space under a cover and for blanketing a solder wave, less gas is used, thus reducing one of the costs of soldering.

In one embodiment, using a nitrogen environment an inspection panel was provided in a cover over a solder reservoir, and it was seen that the solder had a silver reflective surface and had no dross or other oxides formed thereon. Furthermore, tests conducted with printed circuit boards having metallized holes therein provided good wicking of the solder up into the holes and good wetting of the solder on the metallized surfaces.

The present invention provides an apparatus for wave soldering an element comprising a solder reservoir adapted to contain molten solder, and having at least one solder wave nozzle projecting therefrom, pump means for forming a solder wave from the nozzle, cover means for covering at least a portion of the reservoir having at least one longitudinal slot for the solder wave to pass therethrough, supply means for supplying pressurized gas to the underside of the cover means, the gas permitted to pass upwards through the slot on both sides of the solder wave and provide a gas blanket over the solder wave, and conveyor means for moving the element in a predetermined path over the cover means ensuring at least a portion of the element passes through the solder wave.

The present invention also provides a process for wave soldering an element comprising the steps of projecting a solder wave from a solder nozzle above a solder reservoir, through a slot in a cover means, providing an inert gas supply underneath the cover means to pass through the slot on both sides of the solder wave and blanket the solder wave, and passing the element in a predetermined path above the cover means so that at least a portion of the element passes through the solder wave while being blanketed by inert gas.

BRIEF DESCRIPTION OF DRAWINGS

In drawings which illustrate embodiments of the present invention.

MODES FOR CARRYING OUT THE INVENTION

Figure 1:
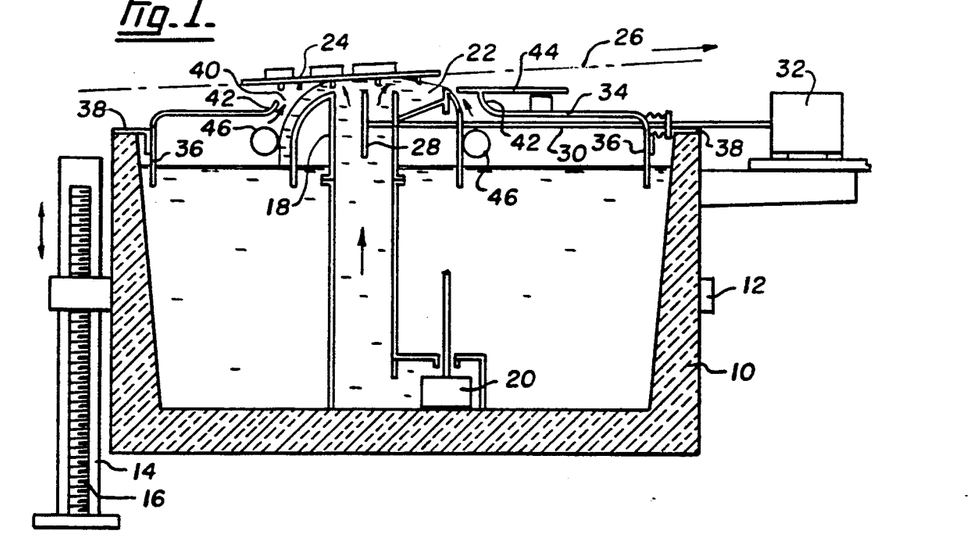
FIG. 1 is a sectional view through a solder reservoir having a solder wave nozzle therein and with a cover plate arrangement according to one embodiment of the present invention.

A solder reservoir 10 is shown in FIG. 1 supported by a support frame 12 which in turn is connected to a screw jack 14 having a screw 16 that can be rotated to lower and then raise the solder reservoir 10. The reservoir 10 is shown in the position for wave soldering, and can be lowered for maintenance purposes.

In the solder reservoir 10 a solder nozzle 18 extends up above the solder level and a pump 20 pumps solder up through nozzle 18 to form a solder wave 22. The solder wave 22 illustrated is similar to that shown in U.S. Pat. No. 3,921,888 to Elliott et al and provides a smooth laminar flow solder wave 22 which is non-turbulent. An element 24 such as a printed circuit board is shown passing in a conveyor path 26 so that at least a portion of the board 24 passes through the solder wave 22. In some cases the solder wave is arranged to only contact the underside of the board 24, however, the height of the solder wave can be adjusted by varying the pump flow and/or by raising and lowering the reservoir 10 to suit the different soldering requirements.

A vibrator plate 28 in the nozzle 18 is attached to a rod 30 connecting to a vibrator 32 to provide an oscillation or vibration to the solder wave 22 during the passage of a printed wiring board therethrough. The vibratory arrangement is disclosed in U.S. Pat. No. 4,684,056 to Deambrosio. The oscillation or vibration aids in filling or wicking up into small holes in the boards. Crevices and corners adjacent to a solder mask are also solder wetted, as well as all other areas where solder wetting is difficult to achieve by conventional machines.

A cover plate 34 is shown over the top of the solder reservoir 10, and has skirts 36 which extend around the perimeter of the plate and extend down into the solder in the reservoir 10 to provide a seal thus providing a contained space under the cover plate 34. Brackets 38 support the cover plate 34 on the sides of the reservoir 10. The cover plate 34 has a longitudinal slot 40 which extends along the solder wave and provides an aperture through which the solder wave projects. Lips 42 are shown around the edges of the slot 40 to provide a curved edge. The lips 42 are not always necessary as will be seen in the later drawings. On the downstream side of the solder wave 22, a sliding damper plate 44 is provided to reduce the size of the gap adjacent the downstream side of the solder wave 22. In certain solder waves, the slot 40 extends around the ends as well as the sides. A supply of gas may be supplied if necessary to ensure that the slot at the ends has gas flowing out to blanket the ends as well as the sides of the solder wave.

Gas pipes 46 are shown positioned on each side of the solder wave 24 under the cover plate 34. The gas pipes 46 may be gas diffusers or, alternatively, may be pipes with holes therein. They are positioned as close to the solder wave as possible and in some instances the solder may touch or even flow over the gas pipes 46. Gas is supplied to the gas pipes 46 and the gas flows upwards through the slot 42 on each side of the solder wave 22, thus enveloping or blanketing the solder wave 22. When a circuit board 24 passes through the solder wave, the board forms a reaction wall and the gas not only covers the solder wave but also provides a canopy which surrounds the circuit board 24 or element passing through the solder wave. In this manner the gas atmosphere blankets not only the surface of the reservoir within the cover plate 34 but also blankets the surface of the solder wave and provides a canopy over circuit boards or other elements passing through the solder wave 22.

The type of gas used to blanket the solder wave may be an inert gas such a nitrogen, a shield gas, a treatment gas, or reducing gas may be used. In all cases oxygen is excluded to achieve reliable soldering, and preferably to the smallest amount possible. The gas may include additives which are desirable for solder coating of wettable metallic surfaces or for joining at least two wettable metallic surfaces.

Figure 2:
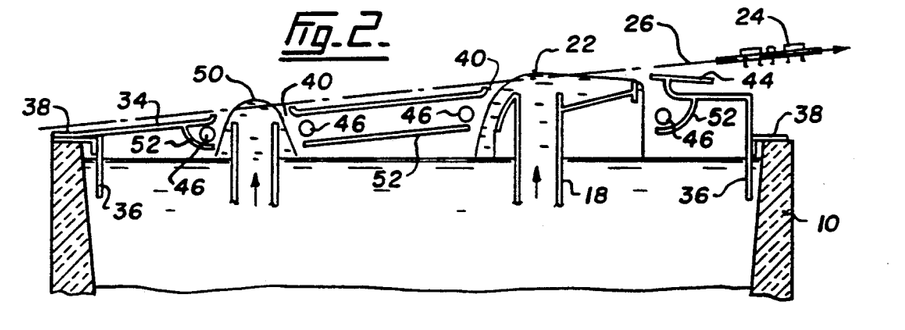
FIG. 2 is a sectional view through a solder reservoir having two solder wave nozzles therein and a cover plate extending over the reservoir having slots therein for the solder waves.
Figure 3:
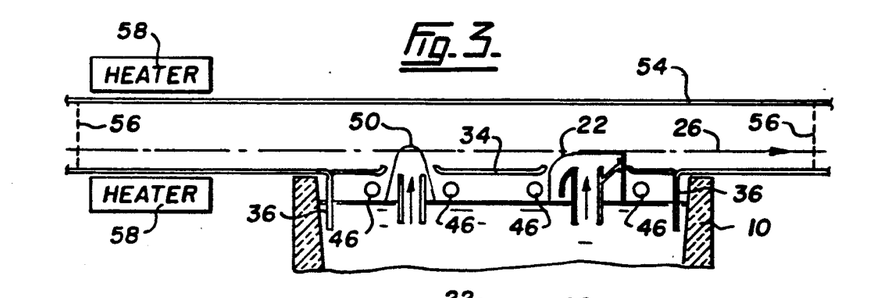
FIG. 3 is a sectional view through a solder reservoir having two solder waves therein with a cover plate over the solder reservoir and including a horizontal conveyor within a tunnel having heaters positioned to preheat elements advancing on the conveyor through the solder waves.

Whereas FIG. 1 illustrates a non-turbulent solder wave, other types of solder waves may be used. For instance, a uni-directional hollow jet wave flowing either with or counter to the direction of movement of the conveyor in the conveyor path 26 may be provided. Single or multiple solder waves can be covered in the manner disclosed herein. There may be two waves of the same type or different types, such as turbulent, non-turbulent, laminar flow, hollow waves, but not limited to these types. FIG. 2 shows another embodiment with two solder waves, a first turbulent solder wave 50, followed by a non-turbulent smooth laminar flow solder wave 22 of the type shown in FIG. 1. In the embodiment of FIG. 2, two slots 40 are provided for the two solder waves 22 and 50. The conveyor path 26 for the circuit boards 24 is shown inclined however in other embodiments the conveyor path may be horizontal as is illustrated in FIG. 3. Beneath the cover plate 34, gas pipes 46 are shown on both sides of the two solder waves 22 and 50. Baffles 52 are provided underneath the gas pipes 46 to ensure that a majority of the gas is directed to flow through the slots 40 adjacent the solder waves 22 and 50 to blanket the solder waves. Whereas gas pipes 46 are shown on both sides of the solder wave, in another embodiment gas is supplied directly to the space under the cover plate in a sufficient quantity to ensure that no air remains in the space and gas passes out of the slot 40 on both sides of the solder wave.

FIG. 3 shows another embodiment wherein a hood, enclosure or tunnel 54 is provided to contain a horizontal conveyor path 26. Curtains 56, either gas curtains or flaps, are shown at the entrance and exit to the tunnel 54 and heaters 58 are provided to preheat elements that pass along the conveyor path 26 within the tunnel 54. Whereas the conveyor path 26 is shown as being horizontal, it may be inclined upwards in the direction of travel. The tunnel or hood 54 may contain an inert gas atmosphere or a shield gas atmosphere that excludes oxygen which may or may not be different to that provided under the cover plate 34 above the solder in the reservoir 10. The solder pipes 46 still provide a gas to blanket the solder waves 22 and 50 and react with boards 24 passing through the solder waves. Heaters 58 are shown in FIG. 3 to illustrate that a preheat may occur within an enclosed and controlled atmosphere. In another embodiment, a fluxer may be included prior to soldering, or other treatment may be applied to the boards prior to soldering.

Figure 4:
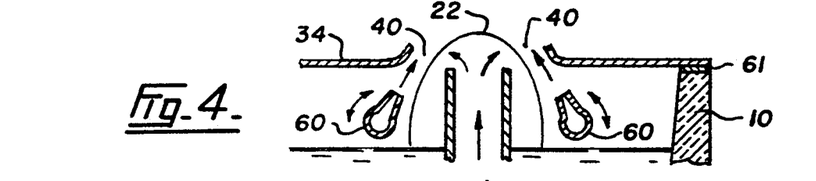
FIG. 4 is a sectional view through a solder wave showing gas knife jets directing gas into the slot on both sides of the solder wave.

FIG. 4 illustrates an embodiment wherein gas knife jets 60 are shown positioned on both sides of a solder wave 22 directed to produce a jet or line of gas towards the slot 40 on each side of the solder wave 22. The cover 34 is shown having a seal 61 to the top side of the reservoir 10. In this embodiment, no skirt 36, as shown in FIGS. 1, 2 and 3 is provided, instead the cover 34 seals to the rim of the reservoir 10. In the case of a tunnel 54 as shown in FIG. 3 over a solder reservoir, the skirts 36 may be replaced with seals 62 around the rim of the reservoir 10.

Figure 5:
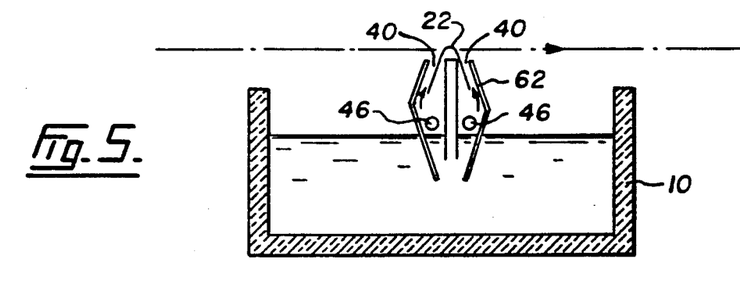
FIG. 5 is a sectional view showing a solder wave having a shroud with gas diffusers therein.

FIG. 5 illustrates another embodiment wherein a shroud 62 is shown surrounding a solder wave 22. The term "shroud" used herein is to distinguish the article from a cover. The shroud generally surrounds the solder wave and the area in the solder reservoir adjacent to it. A shroud is a type of cover in the present text. Gas diffusers or gas pipes 46 provide gas within the shroud 62 which has skirts extending down below the level of solder in the reservoir 10. The gas flows upwards in the slot 40 on each side of the solder wave to blanket the solder wave. If gaps are provided between the shroud 62 and the ends of the solder wave, then gas flows from these gaps.

Figure 6:
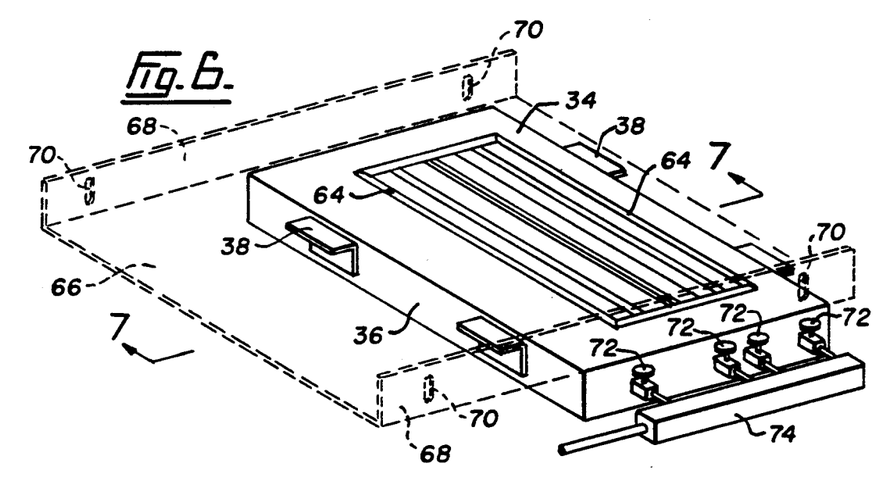
FIG. 6 is an isometric view with a tray in dotted line above a cover plate for two solder waves.
Figure 7:
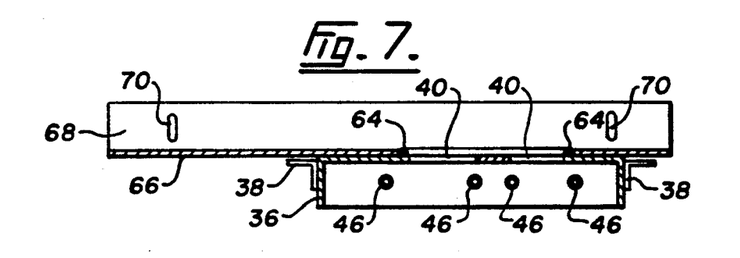
FIG. 7 is a sectional view taken at line 7—7 of FIG. 6.

FIGS. 6 and 7 illustrate a cover plate suitable for a solder machine having two solder waves therein. The cover plate 34 has skirts 36 extending around all four sides and has two slots 40 for the solder waves to pass therethrough with a perimeter bead 64 extending around the peripheral outside edges of the slots, but not the inside edges. The cover plate is separate from but mates with a tray 66 having side plates 68 extending upwards at both ends. The side plates 68 have slots 70 therein for attachment for example to a conveyor support frame (not shown) of a soldering machine. The slots 70 allow limited vertical movement of the tray 66 and hence the cover plate 34 thus takes into account height adjustment of the solder reservoir 10 when required. The tray 66 remains in position attached to the conveyor support frame when the solder reservoir 10 with cover plate 34 thereon is lowered for maintenance purposes. The bead 64 acts as a guide to position the cover plate 34 so that it mates to the tray 66 when the solder reservoir 10 is raised up to a soldering position.

The gas pipes 46 are shown each having individual valves 72 so that the flow of gas can be controlled to each individual pipe. The gas is supplied through a manifold 74 for feeding to the pipes.

Figure 8:
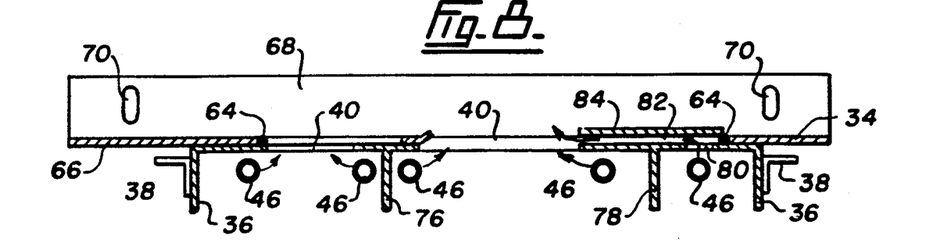
FIG. 8 is a sectional view of another embodiment of a cover plate for two solder waves.

FIG. 8 illustrates another embodiment of a cover plate wherein a first intermediate skirt 76 is shown between the two gas pipes 46 beneath the strip between the two slots 40. A further intermediate skirt 78 is shown adjacent the gas pipe 46 on the downstream side of the second solder wave and the cover plate 34 between the intermediate skirt 78 and the end skirt 36 has a series of holes 80 therein which extend into a channel 82 formed by a top plate 84 attached to the perimeter bead 64. The channel 82 directs gas to flow substantially horizontally towards the downstream solder wave to provide a jet or stream of gas. Thus two gas flows are provided, one through the gas pipe 46 directly on the side of the solder wave and the other through the channel 82. By providing the substantially horizontal flow of gas, improved blanketing of certain gas waves is achieved. By utilizing valves 72 to the gas supply for individual gas pipes 46 different flows of gas can be arranged through the different slots on both sides of the solder waves thus ensuring that satisfactory blanketing of the solder wave and reaction with the board passing through the solder wave is attained.

Figure 8A:
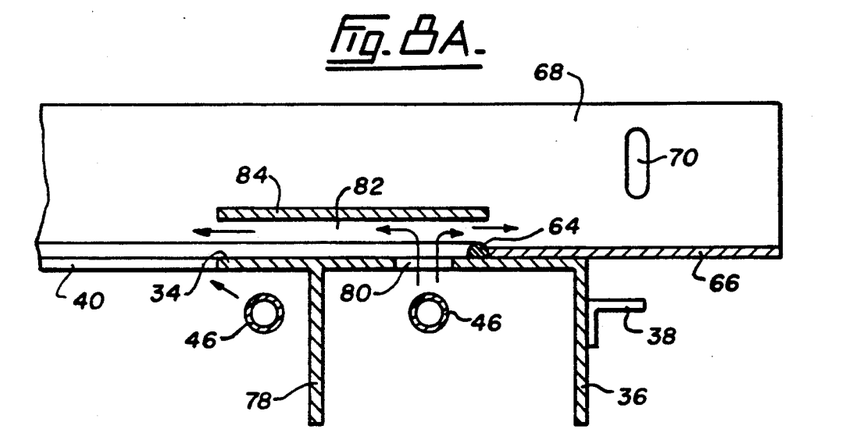
FIG. 8A is a detail sectional view of another embodiment of a cover plate similar to that shown in FIG. 8.

Another embodiment is shown in FIG. 8A, similar to that shown in FIG. 8, wherein the top plate 84 is raised up providing a wider channel 82 and the gas is then able to flow in both directions. It has been found that when the gas flows only in one direction as shown in FIG. 8, air which is entrained along the bottom surface of the top plate 84 is drawn into the jet or stream of gas. By providing for the gas to escape in both directions along the channel 82, less air is drawn into the stream of gas applied to the solder stream. This reduces air substantially around the solder wave and results in clean oxide free soldering.

Figure 9:
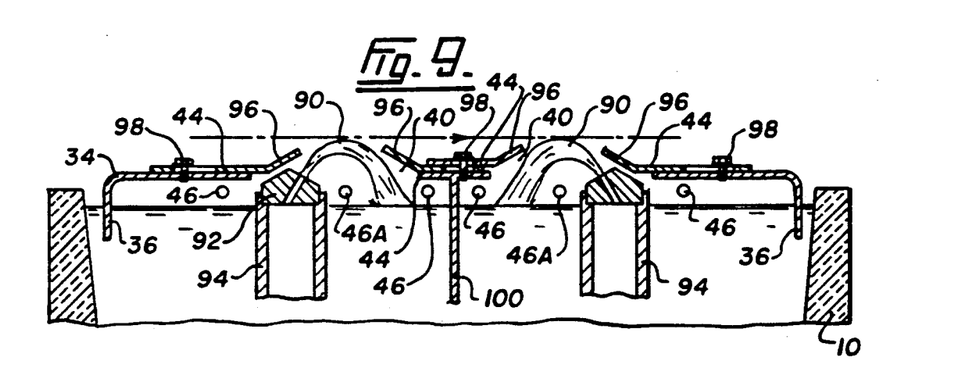
FIG. 9 is a sectional view through a solder reservoir having two hollow wave nozzles therein and a cover plate extending over the reservoir having slots therein for the solder waves.

Two hollow solder waves 90 are shown in FIG. 9 directed towards each other from hollow wave nozzles 92 fitted into chimneys 94. The nozzles 92 are replaceable to permit different nozzles having different angles of projection, and different sized jets. The jets may be a plurality of round holes in a row, or may be a slit.

A cover plate 34 extends over the surface of the solder reservoir, and has skirts 36 extending down into the solder. Two slots 40 are provided in the cover plate 34 for the two hollow solder waves 90. In another embodiment the center cover skirts between the two slots may be considered as a second cover. Sliding damper plates 44 with sloped flanges 96 are positioned adjacent the sides of the slots, and machine screws 98 are provided to clamp the damper plates 44 in place. The damper plates 44 can be positioned to just clear the solder waves 90 and can be adjusted for different flows and angles of solder wave.

Gas pipes 46, preferably gas diffusers, are positioned below the cover plate 34 on each side of the solder waves 90. In another embodiment, although not always required, gas pipes 46A are placed underneath the solder waves so that gas blankets all sides of the solder wave. A divider sheet 100 is positioned in between the solder waves 90 extending up to the cover plate 34. Gas pipes 46 are placed on each side of the divider sheet 100 so that different gas flows can be applied to each solder wave.

Figure 10:
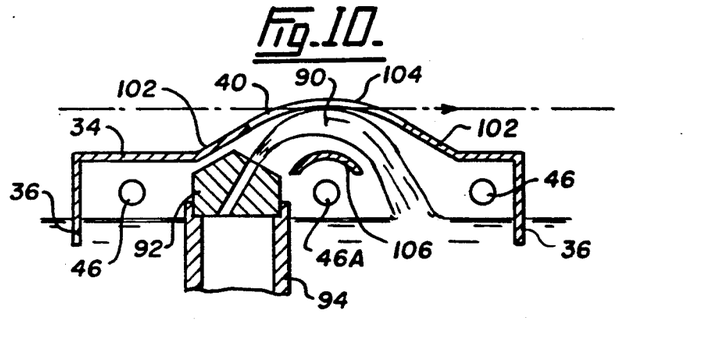
FIG. 10 is a sectional view showing another hollow wave nozzle and a cover plate.

Another embodiment of cover plate 34 for a single hollow solder wave 90 is shown in FIG. 10. The cover plate has sloped lips or flanges 102 which extend to a complete cover 104 at each end of the solder wave. Thus the slot 40 is cut from the cover plate 34 without having damper plates 44. A separate curved cover 106 is provided over the gas pipe 46A under the solder wave 90. This curved cover 106 ensures the gas is deflected to the exposed surfaces of the solder reservoir and the undersurface of the solder wave.

Figure 11:
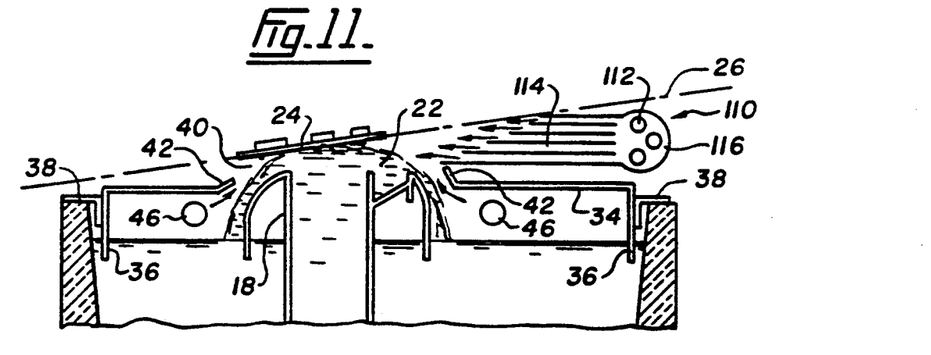
FIG. 11 is a sectional view through a solder reservoir with a solder wave nozzle similar to that shown in FIG. 1 with a diffuser arrangement on top of the cover plate to provide laminar flow across the surface of the solder wave.

The solder wave 22 of FIG. 1 is similar to that shown in U.S. Pat. No. 3,921,888 to Elliott, and in the embodiment shown in FIG. 11, a separate diffuser arrangement 110 is located above the cover plate 34, downstream of the solder wave 22. The diffuser arrangement has three diffusers 112 therein and a series of substantially parallel flat vanes 114 which extend from a surrounding housing 116. Inert gas, preferably nitrogen, is expelled from the diffusers 112 and flows along the vanes 114 to produce a laminar flow of gas which is entrained by the gas exiting from under the cover plate 34. The vanes 114 are shown to be substantially horizontal and the conveyor path 26 sloped upwards. In another embodiment the conveyor path 26 is horizontal, and the vanes 114 are arranged either horizontally or sloping to ensure that there is laminar flow from the diffuser arrangement 110 to entrain with the laminar flow of gas from under the cover plate 34 and blanket the solder wave with a laminar flow of gas.

Various changes may be made to the embodiments shown herein without departing from the scope of the present invention which is limited only by the following claims.

The embodiments of the present invention in which an exclusive property or privelege is claimed are defined as follows:

1. An apparatus for wave soldering an element comprising:
   a solder reservoir adapted to contain molten solder, and having at least one solder wave nozzle projecting therefrom;
   pump means for forming a solder wave from the nozzle;
   cover means for covering at least a portion of the reservoir having at least one longitudinal slot for the solder wave to pass therethrough;
   supply means for supplying pressurized gas to the underside of the cover means in the form of gas discharge pipes extending on both sides of the solder wave beneath the longitudinal slot in the cover means, the gas permitted to pass upwards through the slot on both sides of the solder wave and provided a gas blanket over the solder wave, and
   conveyor means for moving the element in a predetermined path over the cover means ensuring at least a portion of the element passes through the solder wave.

2. The apparatus for wave soldering an element according to claim 1 wherein the cover means comprises a cover plate extending over the reservoir and having skirts at the edges of the cover plate to extend down below a level representing a solder level in the solder reservoir.

3. The apparatus for wave soldering an element according to claim 1 wherein the cover means comprises a cover plate having raised lips on both sides of the longitudinal slot.

4. The apparatus for wave soldering an element according to claim 1 wherein the supply means for supplying pressurized gas includes gas diffusers extending on both sides of the solder wave beneath the longitudinal slot in the cover means.

5. The apparatus for wave soldering an element according to claim 4 including baffles positioned underneath the gas diffusers, between the diffusers and above a level representing a solder level in the solder reservoir.

6. The apparatus for wave soldering an element according to claim 1 wherein the cover means comprises a cover plate that mates with a tray having side panels extending vertically at both ends, the side panels having vertical slots therein for attachment, the slots permitting limited vertical movement between the solder reservoir and the conveyor means.

7. The apparatus for wave soldering an element according to claim 1 wherein the cover means comprises a cover plate and including a damper plate on at least one side of the longitudinal slot for positioning at least partially across the longitudinal slot to limit size of the slot.

8. The apparatus for wave soldering an element according to claim 1 wherein two solder wave nozzles project from the solder reservoir, one nozzle providing a turbulent wave and the other nozzle providing a nonturbulent wave, the cover means having longitudinal slots for each wave.

9. The apparatus for wave soldering an element according to claim 1 wherein the conveyor means moves the element in a substantially horizontal path.

10. The apparatus for wave soldering an element according to claim 1 wherein the conveyor means moves the element in an upward inclined path.

11. The apparatus for wave soldering an element according to claim 1 wherein the cover means comprises a retrofit cover and supply means for supplying pressurized gas for installation on an existing solder wave machine.

12. The apparatus for wave soldering an element according to claim 1 including a tunnel means through which the conveyor means moves the element in the predetermined path.

13. The apparatus for wave soldering an element according to claim 12 including a skirt means to seal the tunnel means and the cover means extending below a level representing a solder level within the solder reservoir.

14. The apparatus for wave soldering an element according to claim 12 including seal means around periphery of the solder reservoir to seal the tunnel means and the cover means to the solder reservoir.

15. The apparatus for wave soldering an element according to claim 12 including a preheater means to preheat elements in the tunnel means prior to soldering.

16. The apparatus for wave soldering an element according to claim 1 wherein the supply means for supplying pressurized gas comprises a gas knife jet to direct gas towards the longitudinal slot on both sides of the solder wave.

17. The apparatus for wave soldering an element according to claim 16 wherein the gas knife jet is swivel mounted to change the direction of gas flow.

18. The apparatus for wave soldering an element according to claim 4 including control means for supplying gas to each diffuser to provide different gas flows to each diffuser.

19. The apparatus for wave soldering an element according to claim 2 including intermediate skirts extending down below the cover plate to a level representing a solder level in the solder reservoir, and wherein the supply means for supplying pressurized gas includes gas diffusers on both sides of the solder wave, the intermediate skirts separating space below the cover plate into a plurality of compartments each having diffusers therein.

20. The apparatus for wave soldering an element according to claim 1 wherein the cover means comprises a cover plate with the longitudinal slot therein, and including a channel on the cover plate adjacent the slot connected to the supply means for pressurized gas to provide a flow of gas directed towards the solder wave above the cover plate and separate from the gas passing upwards through the slot on both sides of the solder wave.

21. The apparatus for wave soldering an element according to claim 20 wherein the channel has openings directed towards the solder wave and away from the solder wave above the cover plate.

22. An apparatus for wave soldering an element comprising:
   a solder reservoir adapted to contain molten solder, and having at least one solder wave nozzle for producing a hollow solder wave projecting therefrom;
   pump means for forming the solder wave from the nozzle;
   cover means for covering at least a portion of the reservoir having at least one longitudinal slot for the solder wave to pass therethrough;
   supply means for supplying pressurized gas to the underside of the cover means in the form of gas discharge pipes extending on both sides of the solder wave beneath the longitudinal slot in the cover means, the gas permitted to pass upwards through the slot on both sides of the solder wave and provide a gas blanket over the solder wave, and
   conveyor means for moving the element in a predetermined path over the cover means ensuring at least a portion of the element passes through the solder wave.

23. The apparatus for wave soldering an element according to claim 22 wherein the supply means for supplying pressurized gas are provided on a side of the solder wave nozzle away from direction of the hollow solder wave, and adjacent the solder wave falling to the solder reservoir.

24. The apparatus for wave soldering an element according to claim 23 wherein the supply means comprises a gas diffuser positioned on a side of the solder wave nozzle away from the direction of the hollow solder wave, and positioned adjacent the solder wave falling to the solder reservoir.

25. The apparatus for wave soldering an element according to claim 23 wherein additional supply means for supplying pressurized gas is provided under the solder wave.

26. The apparatus for wave soldering an element according to claim 25 wherein the additional supply means comprises a gas diffuser positioned under the solder wave.

27. The apparatus for wave soldering an element according to claim 26 including an additional cover means under the solder wave and above the gas diffuser positioned under the solder wave.

28. An apparatus for wave soldering an element comprising:
   a solder reservoir adapted to contain molten solder, and having two solder wave nozzles project from the solder reservoir, a first nozzle for producing a first hollow solder wave projecting in direction of movement of the element in the predetermined path, followed by a second nozzle for producing a second hollow solder wave projecting counter to the direction of movement of the element in the predetermined path;
   pump means for forming the first and second solder waves from the first and second nozzles;
   cover means for covering at least a portion of the reservoir having at least one longitudinal slot for each of the solder waves to pass therethrough;
   supply means for supplying pressurized gas to the underside of the cover means in the form of gas discharge pipes extending on both sides of the solder waves beneath the longitudinal slots in the cover means, the gas permitted to pass upwards through the slots on both sides of the solder waves and provides a gas blanket over the solder waves, and
   conveyor means for moving the element in a predetermined path over the cover means ensuring at least a portion of the element passes through the solder wave.

29. The apparatus for wave soldering an element according to claim 28 including a second cover means for covering the reservoir between the first hollow solder wave and the second hollow solder wave.

30. The apparatus for wave soldering an element according to claim 29 wherein the supply means comprises a plurality of gas diffusers placed on both sides of the first and second solder waves.

31. The apparatus for wave soldering an element according to claim 30 wherein gas diffusers are placed under the solder waves.

32. The apparatus for wave soldering an element according to claim 30 wherein a vertical divider is positioned in the solder reservoir beneath the second cover means and wherein gas diffusers are located on both sides of the vertical divider beneath the second cover means.

33. The apparatus for wave soldering an element according to claim 29 wherein the cover means comprise damper plates having adjustment means to position the damper plates adjacent the solder waves.

34. An apparatus for wave soldering an element comprising:
   a solder reservoir adapted to contain molten solder, and having at least one solder wave nozzle projecting therefrom;
   pump means for forming a solder wave from the nozzle;
   cover means for covering at least a porting of the reservoir having at least one longitudinal slot for the solder wave to pass therethrough wherein the cover means is in the form of a cover plate extending over the reservoir and having skirts at the edges of the cover plate to extend down below a level representing a solder level in the solder reservoir;
   supply means for supplying pressurized gas to the underside of the cover means, the gas permitted to pass upwards through the slot on both sides of the solder wave and provide a gas blanket over the solder wave;
   a gas diffuser arrangement located above the cover plate downstream of the solder wave, the gas diffuser arrangement having vanes means to supply laminated flow of gas towards the solder wave to entrain with gas passing upwards through the slot on the downstream side of the solder wave and form a laminated flowing gas blanket over the solder wave, and
   conveyor means for moving the element in a predetermined path over the cover means ensuring at least a portion of the element passes through the solder wave.

35. The apparatus for wave soldering an element according to claim 34 wherein the vane means comprises a plurality of substantially parallel vanes with spaces therebetween extending from a housing about a gas diffuser source.

36. An apparatus for wave soldering an element comprising:

a solder reservoir adapted to contain molten solder, and having at least one solder wave nozzle projecting therefrom;

pump means for forming a solder wave from the nozzle;

shroud means surrounding the nozzle having skirts extending down below a level representing solder level in the solder reservoir, the shroud means forming longitudinal gaps on both sides of the solder wave;

supply means for supplying pressurized gas within the shroud means in the form of gas discharge pipes extending on both sides of the solder wave beneath the longitudinal slot in the cover means, the gas permitted to pass upwards through the longitudinal gaps on both sides of the solder wave, and conveyor means for moving the element in a predetermined path over the shroud means, ensuring at least a portion of the element passes through the solder wave.

37. A cover for use with a solder reservoir having at least one solder wave nozzle and means for forming a solder wave from the nozzle, the cover comprising:

a shroud means to surround the nozzle having a skirts to extend down below a level representing solder level in the solder reservoir, the shroud means having at least one slot to fit over the solder wave and provide longitudinal gaps on both sides of the solder wave, and gas diffuser means below the shroud means on both sides of the slot, adapted to permit gas to pass upwards through the longitudinal gaps on both sides of the solder wave.

38. A process for wave soldering an element comprising the steps of:

projecting a solder wave from a solder nozzle above a solder reservoir, through a slot in a cover means;

providing an inert gas supply underneath the cover means in the form of gas discharge pipes extending on both sides of the solder wave beneath the slot in the cover means, to pass through the slot on both sides of the solder wave and blanket the solder wave, and passing the element in a predetermined path above the cover means so that at least a portion of the element passes through the solder wave while being blanketed by inert gas.

39. The process of wave soldering an element according to claim 38 wherein the inert gas comprises nitrogen.

40. The process of wave soldering an element according to claim 38 wherein the inert gas is supplied underneath the cover means by means of gas diffusers positioned on both sides of the solder wave.

41. The process of wave soldering an element according to claim 38 wherein a plurality of solder waves are projected from solder nozzles above the solder reservoir, and wherein inert gas is supplied by gas diffusers positioned underneath the cover means to pass through slots on both sides of the solder waves and blanket the solder waves.

42. The process of wave soldering an element according to claim 41 wherein the supply of gas to each of the gas diffusers is variable.

43. The process of wave soldering an element according to claim 38 wherein the predetermined path is substantially horizontal.

44. The process of wave soldering an element according to claim 38 wherein the predetermined path is inclined.

45. The process of wave soldering an element according to claim 38 wherein the predetermined path passes through a tunnel having a controlled atmosphere therein.

46. The process of wave soldering an element according to claim 45 wherein the element is heated in the tunnel prior to passing through the solder wave.

47. The process of wave soldering an element according to claim 38 wherein inert gas is supplied through gas knife jets that can be swivelled to direct the flow of the gas through the slot to both sides of the solder wave and blanket the solder wave.

48. The process of wave soldering an element according to claim 38 including directing a further flow of gas towards one side of the solder wave from a channel above the cover means separate from the gas passing through the slot on both sides of the solder wave.

49. A cover for use with a solder reservoir having at least one solder wave nozzle and means for forming a solder wave from the nozzle, the cover comprising:

a shroud means to surround the nozzle, the shroud means having at least one slot to fit over the solder wave and provide longitudinal gaps on both sides of the solder wave, and gas diffuser means below the shroud means on both sides of the slot, adapted to permit gas to pass upwards through the longitudinal gaps on both sides of the solder wave.

* * * * *